(12) United States Patent
Shimizu

(10) Patent No.: US 8,867,107 B1
(45) Date of Patent: Oct. 21, 2014

(54) IMAGE READING APPARATUS AND READING APPARATUS

(71) Applicant: Fuji Xerox Co., Ltd., Tokyo (JP)

(72) Inventor: Kosuke Shimizu, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/090,256

(22) Filed: Nov. 26, 2013

(30) Foreign Application Priority Data

Jun. 24, 2013 (JP) .................................. 2013-131703

(51) Int. Cl.
*H04N 1/04* (2006.01)
*H04N 1/047* (2006.01)

(52) U.S. Cl.
CPC .................................... *H04N 1/047* (2013.01)
USPC ............ 358/474; 358/498; 358/475; 382/275

(58) Field of Classification Search
CPC ............ H04N 1/4097; H04N 1/00082; H04N 1/1013; H04N 1/1017; H04N 1/401; H04N 2201/03112; H04N 2201/0418; H04N 1/00087
USPC ......... 358/474, 487, 509, 463, 2.1, 461, 1.15, 358/1.6, 1.9, 3.24, 3.27, 406, 451, 452, 482, 358/484, 494, 498, 506, 512, 519, 533, 358/475; 382/275
See application file for complete search history.

(56) References Cited

U.S. PATENT DOCUMENTS

| | | | | |
|---|---|---|---|---|
| 5,754,315 A | * | 5/1998 | Tazawa et al. ................. | 358/498 |
| 6,088,546 A | * | 7/2000 | Inoue et al. ..................... | 399/45 |
| 6,809,842 B1 | * | 10/2004 | Tsai et al. ...................... | 358/471 |
| 7,512,374 B2 | * | 3/2009 | Ono et al. ....................... | 399/367 |
| 8,180,179 B2 | * | 5/2012 | Muramatsu .................... | 382/299 |
| 8,488,216 B2 | * | 7/2013 | Sakamoto et al. ............. | 358/475 |
| 8,576,462 B2 | * | 11/2013 | Kanaya et al. ................. | 358/498 |

FOREIGN PATENT DOCUMENTS

| | | |
|---|---|---|
| JP | A-06-178054 | 6/1994 |
| JP | A-08-214123 | 8/1996 |
| JP | A-2002-247299 | 8/2002 |
| JP | A-2012-039316 | 2/2012 |
| JP | A-2012-244383 | 12/2012 |

OTHER PUBLICATIONS

Mar. 25, 2014 Notification of Reason for Refusal issued in Japanese Patent Application No. 2013-131703 (with English-language translation).
Nov. 5, 2013 Office Action issued in Japanese Application No. 2013-131703 (with translation).

* cited by examiner

*Primary Examiner* — Negussie Worku
(74) *Attorney, Agent, or Firm* — Oliff PLC

(57) ABSTRACT

An image reading apparatus includes a transporting member that transports a document, a light source that irradiates the document at a reading position with light, a light receiving unit that receives light reflected at the reading position, a background member that is inclined with respect to the document at the reading position such that, upon reflecting the light emitted from the light source toward the light receiving unit when the document is not present at the reading position, a difference between an incident angle and a reflection angle thereon is less than a difference between an incident angle and a reflection angle on the document at the reading position, and an adjusting unit that adjusts a position or attitude of an acting member such that the light reflected from the background member is received with a greater intensity than light reflected from white paper at the reading position.

13 Claims, 12 Drawing Sheets

FIG. 9
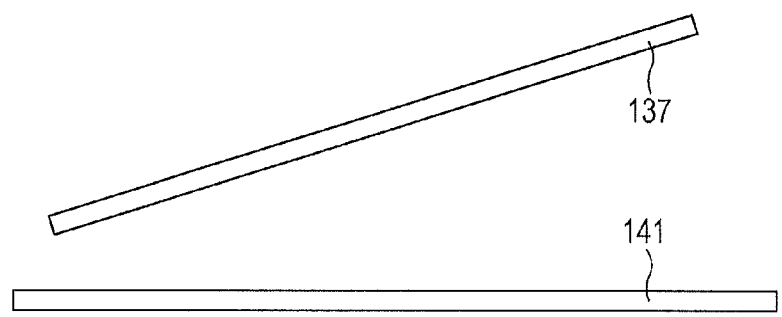
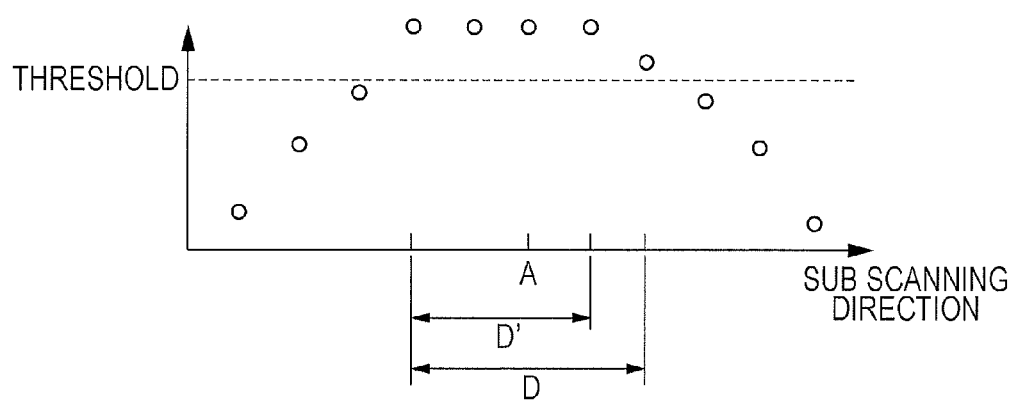

FIG. 11
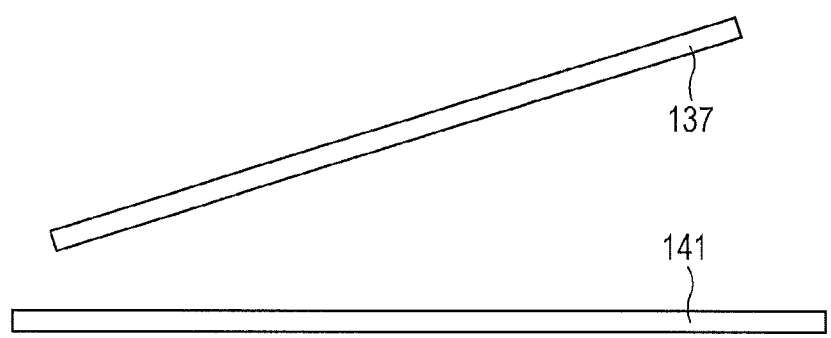
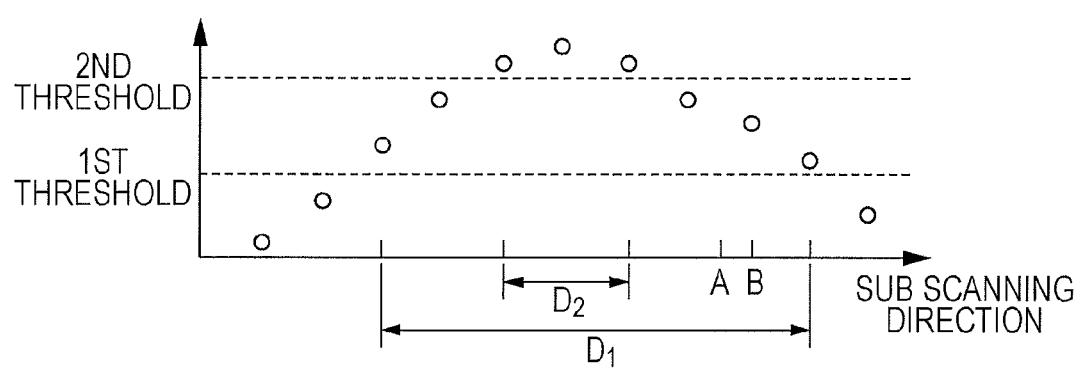

IMAGE READING APPARATUS AND READING APPARATUS

CROSS-REFERENCE TO RELATED APPLICATIONS

This application is based on and claims priority under 35 USC 119 from Japanese Patent Application No. 2013-131703 filed Jun. 24, 2013.

BACKGROUND

Technical Field

The present invention relates to an image reading apparatus and a reading apparatus.

SUMMARY

According to an aspect of the invention, there is provided an image reading apparatus that includes a transporting member that transports a document having an image formed thereon and causes the document to pass through a reading position; a light source that irradiates the document passing through the reading position with light; a light receiving unit that receives light emitted from the light source and reflected at the reading position so as to generate image information; a background member that is arranged at a position such that the document at the reading position is interposed between the background member and the light source, and that is inclined with respect to the document passing through the reading position such that, upon reflecting the light emitted from the light source toward the light receiving unit when the document is not present at the reading position, a difference between an incident angle of the light emitted from the light source and a reflection angle of light reflected toward the light receiving unit is less than a difference between an incident angle and a reflection angle on the document passing through the reading position; and an adjusting unit that adjusts a position or attitude of an acting member, which acts on an intensity of the light reflected from the background member and received by the light receiving unit, such that the light reflected from the background member is received with a greater intensity by the light receiving unit than light reflected from predetermined white paper passing through the reading position.

BRIEF DESCRIPTION OF THE DRAWINGS

An exemplary embodiment of the present invention will be described in detail based on the following figures, wherein:

FIG. 9 is a graph in which average values at respective measurement points are plotted;

FIG. 11 is a graph in which average values at respective measurement points are plotted.

DETAILED DESCRIPTION

Hereinafter, an exemplary embodiment of the present invention will be described.

Figure 1:
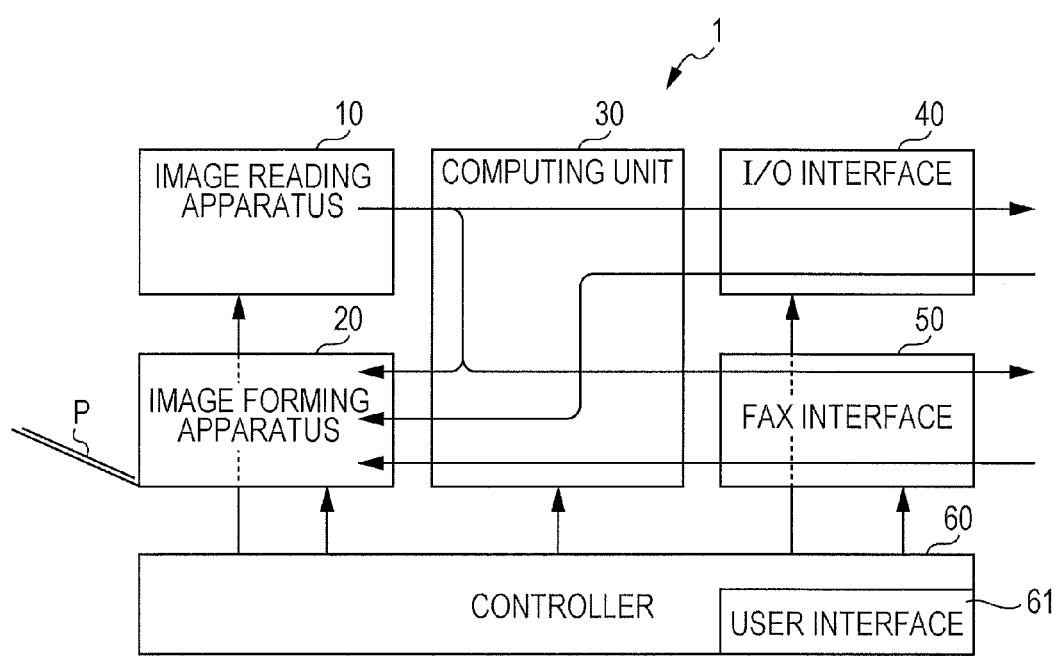
FIG. 1 is a block diagram showing a multifunction machine including an image reading apparatus according to an exemplary embodiment of the present invention.

FIG. 1 is a block diagram showing a multifunction machine 1 including an image reading apparatus 10 according to an exemplary embodiment of the present invention.

The multifunction machine 1 includes the image reading apparatus 10 and an image forming apparatus 20.

The image reading apparatus 10 reads an image of the document so as to generate image information. In the image reading apparatus 10, a document on which an image to be read is recorded is transported through a transport path that passes through a reading position. When the document passes through the reading position, the image of the document is read. A more detailed description will be given below.

Further, in the image forming apparatus 20, an image is formed on paper P on the basis of the image information. The paper P with the image formed thereon is ejected from the image forming apparatus 20. In this exemplary embodiment, the image forming apparatus 20 is a so-called electrophotographic image forming apparatus. However, the image forming apparatus 20 is not limited to an electrophotographic image forming apparatus, and may include an inkjet image forming apparatus and other types of image forming apparatuses.

As will be described below, image information on the basis of which an image is formed by the image forming apparatus 20 is not limited to image information obtained by reading an image of a document in the image reading apparatus 10, but may include image information input from the outside.

The multifunction machine 1 further includes a computing unit 30. The computing unit 30 performs various types of computational processing corresponding to the mode thereof, on the basis of the image information obtained by the image reading apparatus 10 or the image information input from the outside.

The multifunction machine 1 further includes an I/O interface 40 and a FAX interface 50.

The I/O interface 40 is responsible for communication between the multifunction machine 1 and an image editing apparatus (not shown) which typically includes a computer. The I/O interface 40 receives the image information obtained by the image reading apparatus 10 via the computing unit 30, and transmits the image information to the image editing apparatus. In this case, the multifunction machine 1 serves as a scanner. Further, the I/O interface 40 receives image information transmitted from the image editing apparatus. The image information received by the I/O interface 40 is transmitted to the image forming apparatus 20 via the computing unit 30. The image forming apparatus 20 forms an image on paper on the basis of the transmitted image information. In this case, the multifunction machine 1 serves as a printer.

The FAX interface 50 is a module that is connected to a telephone line so as to provide a facsimile function. That is, when in a FAX transmission mode, the image reading apparatus 10 reads a document on which an image to be transmitted by facsimile is recorded so as to generate image information. The generated image information is output to a telephone line via the computing unit 30 and the FAX interface 50 so as to be transmitted to a recipient. When in a FAX reception mode, image information transmitted via a telephone line is received by the FAX interface 50, and is input to the image forming apparatus 20 via the computing unit 30. The image forming apparatus 20 prints an image on paper on the basis of the input image information.

Further, the multifunction machine 1 has a copy function. In a copy mode, image information obtained by reading a document in the image reading apparatus 10 is input to the image forming apparatus 20 via the computing unit 30. The image forming apparatus 20 prints an image on paper on the basis of the input image information.

The multifunction machine 1 further includes a controller 60. The controller 60 includes a user interface 61. The controller 60 performs all the control operations required by the multifunction machine 1, such as switching the above described various functions and modes in accordance with an instruction input by the user from the user interface 61 or the like, for example.

The computing unit 30, the I/O interface 40, the FAX interface 50, and the controller 60 may be disposed in either a housing of the image reading apparatus 10 or a housing of the image forming apparatus 20, or may be separately disposed in the housing of the image reading apparatus 10 and the image forming apparatus 20. As will be described below, in an example illustrated in FIG. 4 and other drawings, these components are disposed in the housing of the image forming apparatus 20. However, in the example illustrated in FIG. 4 and other drawings, the user interface 61 is disposed on the upper surface of the housing of the image forming apparatus 20.

Figure 2A:
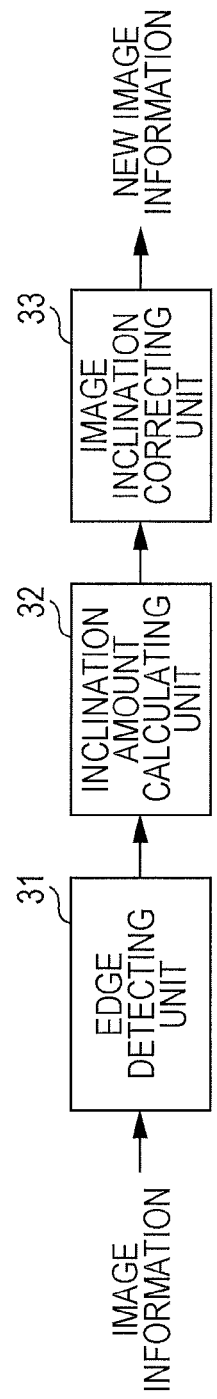
FIGS. 2A and 2B are block diagrams each showing a part of functions of a computing unit of the multifunction machine of FIG. 1.
Figure 2B:
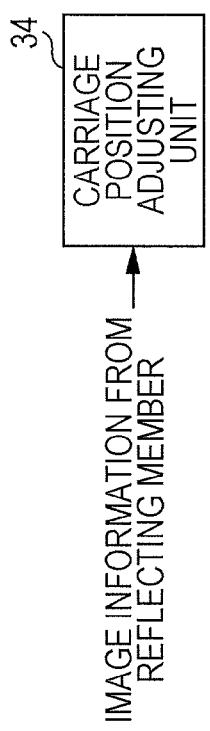

FIGS. 2A and 2B are block diagrams each illustrating a part of functions of the computing unit 30 of the multifunction machine 1 of FIG. 1.

The computing unit 30 performs various computations on the basis of image information. Among those, computation for image inclination correction based on image information (FIG. 2A), which is one of the features of this exemplary embodiment, will be described.

As mentioned above, in the image reading apparatus 10, a document is transported through a transport path that passes through a reading position. When the document passes through the reading position, the image of the document is read. The document that is being transported is often slightly inclined. If the document that is being transported is inclined, the image recorded on the document is read with the same inclination amount as the inclination amount of the document. Thus, image information representing an inclined image is generated.

Among computations performed by the computing unit 30, the computation illustrated in FIG. 2A is a computation for correcting an inclination of the image represented by image information.

The image information obtained by reading the document in the image reading apparatus 10 is input to an edge detecting unit 31 of the computing unit 30. As will be described below in detail, the image information obtained by the image reading apparatus 10 includes information on the image recorded on the document and information on a boundary between the document and the background around the document, that is, the edge of the document. The edge detecting unit 31 detects a leading edge of the document in the transport direction, on the basis of information on the edge of the document included in the input image information. After the leading edge of the document is detected by the edge detecting unit 31, an inclination amount calculating unit 32 calculates the inclination amount of the document. Further, after the inclination amount of the document is calculated, an image inclination correcting unit 33 corrects the inclination of the image represented by the image information, and generates new image information representing the image whose inclination is corrected.

FIGS. 3A through 3D are diagrams showing computation performed by the edge detecting unit 31, the inclination amount calculating unit 32, and the image inclination correcting unit 33 of FIG. 2A.

The edge detecting unit 31 detects a line representing the leading edge of the document by using Hough transform. The inclination amount calculating unit 32 calculates the inclination angle of the line. Further, the image inclination correcting unit 33 performs rotation processing of affine transformation so as to rotate the image of the document in the image information by the amount corresponding to the inclination amount thereof, and thus generates new image information representing the image with no inclination.

Hough transform and affine transformation are well-known computing methods, and therefore will be only briefly described herein.

Among FIGS. 3A through 3D, FIGS. 3A through 3C illustrate Hough transform.

As mentioned above, a document is transported through a transport path that passes through a reading position. When the document passes through the reading position, the image of the document is read, so that image information is generated. This image information includes information on an edge of the document.

Figure 3A:
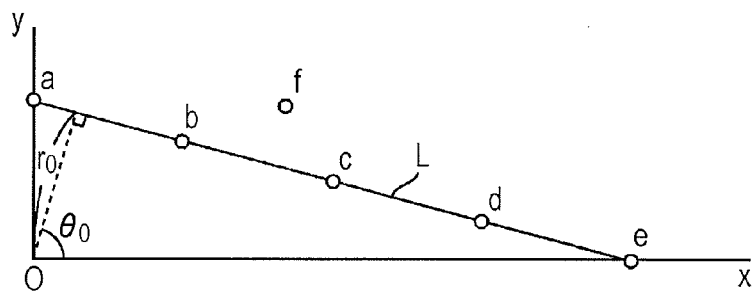
FIGS. 3A through 3D are diagrams showing computation performed by an edge detecting unit, an inclination amount calculating unit, and an image inclination correcting unit of FIG. 2A.

A horizontal axis x in FIG. 3A represents the position of the width direction of the document, and a vertical axis y represents the transport direction of the document.

A line L in FIG. 3A is a line obtained as image information and representing the leading edge of the document. However, this line is still unknown, and points a through f that are expected to be on the leading edge of the document are extracted from the generated image information. Among these points a through f, although there are many points (points a through e in this example) that represent the leading edge of the document, there is an erroneous point (point f in this example).

The line is expressed by the following equation:

$$r = x \cos\theta + y \sin\theta \quad (1)$$

where r is the length of a perpendicular line drawn from an origin O to this line, and $\theta$ is the inclination. As illustrated in FIG. 3A, when $$r = r_0, \theta = \theta_0 \quad (2)$$

are determined, the line L of FIG. 3A is uniquely determined.

Hough transform is a computing method for obtaining (r, $\theta$)=($r_0$, $\theta_0$).

Figure 3B:
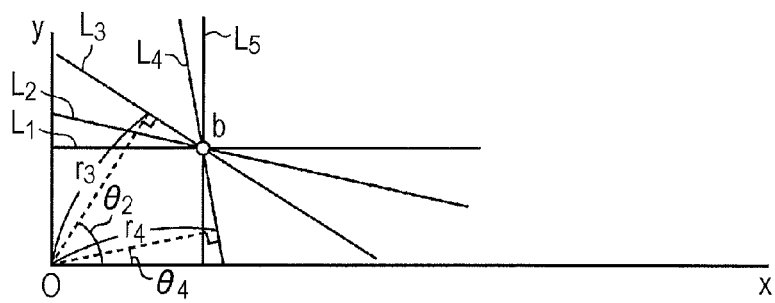

FIG. 3B illustrates the point b of FIG. 3A and various lines passing through the point b (five lines $L_1$ through $L_5$ in this example).

Lines perpendicular to the lines $L_1$ through $L_5$ are drawn from the origin O. The perpendicular lines have lengths $r_i$ and angles $\theta_i$ (i=1, ..., 5). In FIG. 3B, two lines $L_3$ and $L_4$ have lengths $r_3$ and $r_4$ and angles $\theta_3$ and $\theta_4$.

Figure 3C:
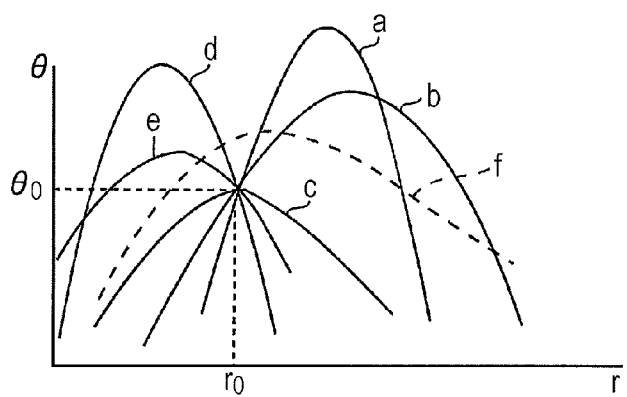

FIG. 3C illustrates a Hough space representing a length r (horizontal axis) and an angle $\theta$ (vertical axis) of a perpendicular line.

When the lengths r and angles θ of lines perpendicular to a large number of lines of FIG. 3B passing through the point b are plotted, a sinusoidal curve shown as a graph b in FIG. 3C is obtained. The curve of the graph b represents a set of lines passing through the point b.

Similarly, not only for the point b of FIG. 3A, a graph representing lengths r and angles θ of perpendicular lines is obtained for each of the points a through f. Thus, as shown in FIG. 3C, graphs a through f are obtained.

The graphs for the points (points a through e in this example) correctly located on the leading edge of the document are curves that pass through a certain point $(r_0, \theta_0)$ in the Hough space of FIG. 3C. On the other hand, the graph f representing a set of lines passing through the erroneous point (point f in this example) is a curve that does not pass through the point $(r_0, \theta_0)$.

In this way, points expected to be on the leading edge of the document are extracted from the image information, and a large number of graphs as shown in FIG. 3C are calculated. Then, a point where many of the graphs cross is detected so as to specify the line L $(r_0, \theta_0)$ of FIG. 3A.

The edge detecting unit 31 of FIG. 2A recognizes the ling L representing the leading edge of the document by performing Hough transform on the basis of the image information as described above.

Figure 3D:
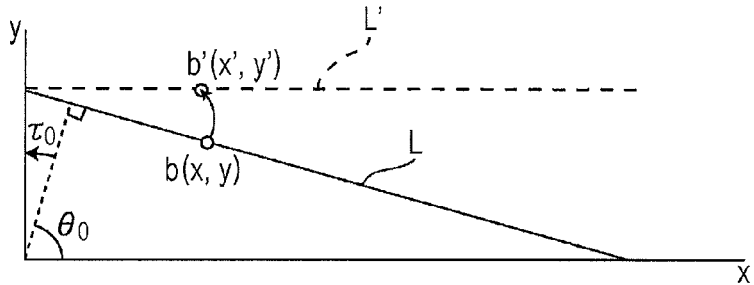

FIG. 3D illustrates computational processing performed by the inclination amount calculating unit 32 and the image inclination correcting unit 33 of FIG. 2A.

In FIG. 3D, the line L representing the leading edge of the document is shown.

In this stage, the line L is uniquely determined by Hough transform which is described with reference to FIGS. 3A through 3C. That is, the angle $\theta_0$ is determined.

The inclination amount calculating unit 32 of FIG. 2A calculates an inclination angle $\tau_0$ of the line L, in other words, the inclination amount of the document, on the basis of the angle $\theta_0$, by performing the following equation:

$$\tau_0 = 90° - \theta_0 \qquad (3)$$

Further, the image inclination correcting unit 33 calculates a line L' with no inclination, by rotating the line L.

That is, when the coordinates of a point (point b in this example) on the line L are (x, y), new coordinates (x', y') obtained by rotating the point b by an angle $\tau_0$ are expressed as follows:

$$x' = x \cos \tau_0 - y \sin \tau_0$$

$$y' = x \sin \tau_0 + y \cos \tau_0 \qquad (4)$$

The image inclination correcting unit 33 of FIG. 2A converts the coordinates of all the pixels of the image represented by the image information, using the above equations (4). Thus, the image information representing the inclined image obtained by reading the inclined document is converted into new image information representing the image obtained by reading the document with no inclination.

The computing unit 30 of FIG. 1 further includes a carriage position adjusting unit 34 shown in FIG. 2B. The carriage position adjusting unit 34 performs a process for adjusting stationary positions of carriages 13A and 13B (see FIGS. 6 and 7). This process will be described below with reference to FIG. 8 and those that follow.

Next, a specific example of the multifunction machine 1 depicted in the block diagram of FIG. 1 will be described.

Figure 4:
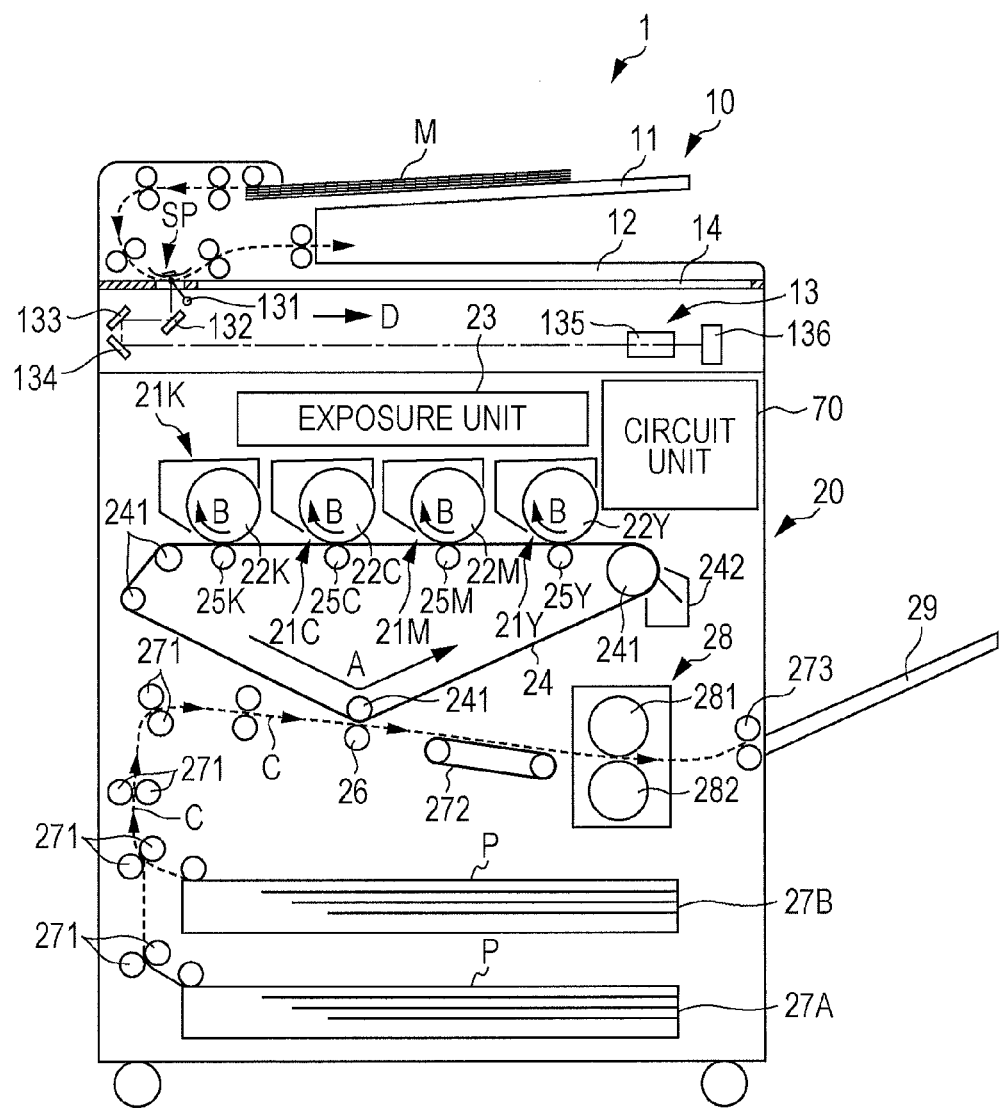
FIG. 4 is a schematic diagram showing the mechanical configuration of the multifunction machine depicted in the block diagram of FIG. 1.

FIG. 4 is a schematic diagram showing the mechanical configuration of the multifunction machine 1 depicted in the block diagram of FIG. 1.

FIG. 4 illustrates the configuration of the image reading apparatus 10 and the image forming apparatus 20 of the multifunction machine 1 of FIG. 1. The other components (the computing unit 30, the I/O interface 40, the FAX interface 50, and the controller 60) shown in FIG. 1 are integrated into one block as a circuit unit 70. Note that the user interface 61 will be separately described below with reference to FIG. 5. The image reading apparatus 10 has a transport reading mode and a stationary reading mode as reading modes for reading an image of the document.

In the transport reading mode, documents M placed on a document tray 11 are transported one by one through the transport path indicated by the broken line, in response to a user's operation. Thus, each document passes through a reading position SP. When passing through the reading position SP, an image recorded on the document is illuminated by a lamp 131. The reflected light is guided to a reading sensor 136 via reflective mirrors 132 through 134 and a lens 135 of a reading optical system, and is read by the reading sensor 136. Thus, image information is generated. In this exemplary embodiment, the reading optical system including the reflective mirrors 132 through 134 and the lens 135, and the reading sensor 136 form a light receiving device 13. The document M having passed through the reading position SP is ejected onto a document output tray 12. A transporting unit that transports the document M will be described below in detail.

The image reading apparatus 10 includes transparent glass 14 on which a document is placed. In the image reading apparatus 10, a hinge is provided that laterally extends at the end thereof in a direction perpendicular to the paper surface of FIG. 4. Thus, the near side thereof may be lifted such that the upper part of the transparent glass 14 is exposed.

In the stationary reading mode, the near side is lifted, and the document M is placed face down on the transparent glass 14. Then, the document is held between the transparent glass 14 and the lower surface of the document output tray 12. Thus, when reading is started in response to a user's operation, the lamp 131 and the mirrors 132 through 134 move along the lower surface of the transparent glass 14 in the direction of the arrow D. The reading sensor 136 reads the image of the document, so that image information is generated.

Next, the overview of the image forming apparatus 20 will be described.

The image forming apparatus 20 is an apparatus that forms an image on paper P by a so-called electrophotographic system.

The image forming apparatus 20 includes image forming units 21K, 21C, 21M and 21Y that form toner images using black (K), cyan (C), magenta (M), and yellow (Y) toner, respectively.

In the following description, in the case where there is no need to distinguish colors, the letters representing colors K, C, M, and Y are omitted, and only reference numerals are used.

Each image forming unit 21 includes an electrophotographic photoreceptor 22 that rotates in the direction of the arrow B. The photoreceptor 22 is charged by a charger (not shown), and is irradiated with exposure light from an exposure unit 23. Thus, an electrostatic latent image is formed on the photoreceptor 22. The electrostatic latent image is developed with toner by a developing unit (not shown), so that a toner image of the corresponding color is formed on the photoreceptor 22.

Further, under the image forming units 21, an intermediate transfer belt 24 is disposed along the array of photoreceptors 22 and is suspended by rollers 241 so as to circulate in the direction of the arrow A. Further, first transfer rollers 25 are disposed in positions facing the respective photoreceptors 22 with the intermediate transfer belt 24 therebetween.

The toner images of different colors formed on the photoreceptors 22 are sequentially transferred and superposed on the intermediate transfer belt 24 by the action of the respective first transfer rollers 25.

Each image forming unit 21 includes a cleaner (not shown) for cleaning an area of the photoreceptor 22 after transfer. The surface of the photoreceptor 22 is cleaned by the cleaner.

The image forming apparatus 20 further includes a second transfer roller 26 such that the tonner images sequentially transferred and superposed on the intermediate transfer belt 24 are transferred onto the transported paper P.

The image forming apparatus 20 includes, at its lower part, a first tray 27A and a second tray 27B for storing paper. Upon transferring the toner images onto the paper P, a sheet of paper P is pulled from either one of the paper trays 27A and 27B, and is transported in the direction of the arrows C by transport rollers 271, and then the toner images on the intermediate transfer belt 24 are transferred onto the paper P when the paper P passes through the position of the second transfer roller 26. The paper P with the toner images transferred thereon is further transported by a transport belt 272, and passes through a fixing unit 28. The fixing unit 28 includes a heating roller 281 and a pressure roller 282. The transported paper P with unfixed toner images is held between the heating roller 281 and the pressure roller 282 so as to be heated and pressed. Thus, the unfixed toner images are fixed onto the paper P. The paper P on which an image formed of the fixed toner images is printed is ejected onto a paper output tray 29 by ejection rollers 273.

After the toner images on the intermediate transfer belt 24 are transferred onto the paper P by the action of the second transfer roller 26, the surface of the intermediate transfer belt 24 is cleaned by a cleaner 242.

Figure 5:
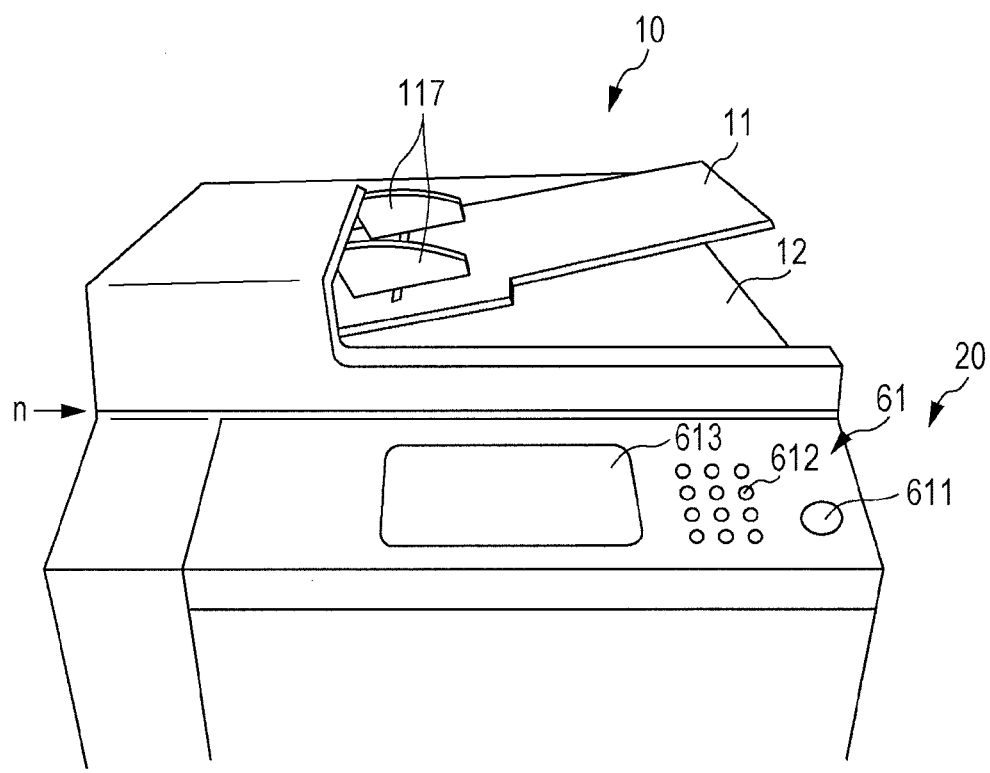
FIG. 5 is an external perspective view showing the upper part of the multifunction machine of FIG. 4.

FIG. 5 is an external perspective view showing the upper part of the multifunction machine 1 of FIG. 4.

FIG. 5 illustrates the external view of the image reading apparatus 10 and the upper part of the image forming apparatus 20.

In the view of the image reading apparatus 10 of FIG. 5, the document tray 11 and the document output tray 12 of FIG. 4 are illustrated. In FIG. 5, a position restricting member 117 for restricting the position of the widthwise position of the document on the document tray 11 is also illustrated. As mentioned above, the image reading apparatus 10 is configured such that an upper part above the line n of FIG. 5 is hinged at the end so as to be lifted. When the upper part is lifted, the document is placed face down on the transparent glass 14 (see FIG. 4) thereunder. The lifted upper part is closed again as shown in FIG. 5, and a start button 611 is pressed. Then, the image reading apparatus 10 reads the image of the document in the stationary reading mode as described above.

Further, in the view of the upper part of the image forming apparatus 20 of FIG. 5, the user interface 61 (see also FIG. 1) is illustrated.

The user interface 61 of FIG. 5 includes the start button 611, a numeric keypad 612, and a touch panel 613 serving also as a display.

When the start button 611 is pressed, the image reading apparatus 10 starts reading the document. The numeric keypad 612 is used for setting the number of copies, the FAX number of the recipient of the FAX transmission, and the like.

Further, the touch panel 613 is used for performing various settings corresponding to the screen displayed thereon.

Figure 6:
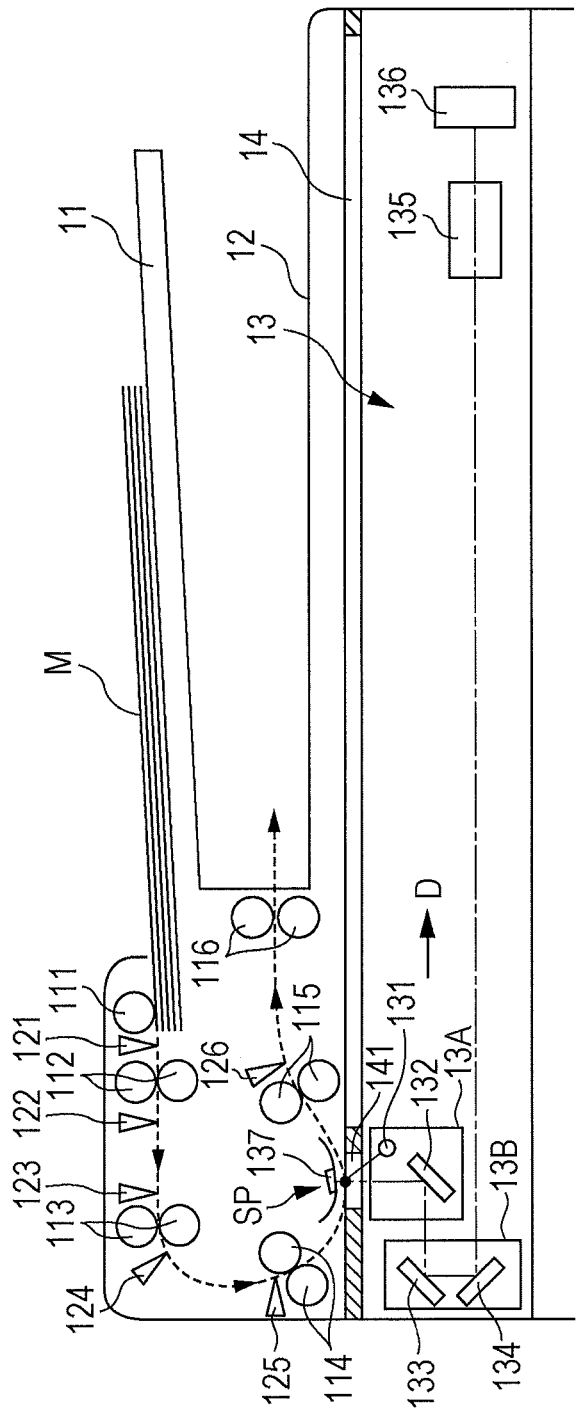
FIG. 6 illustrates an image reading apparatus.
Figure 7:
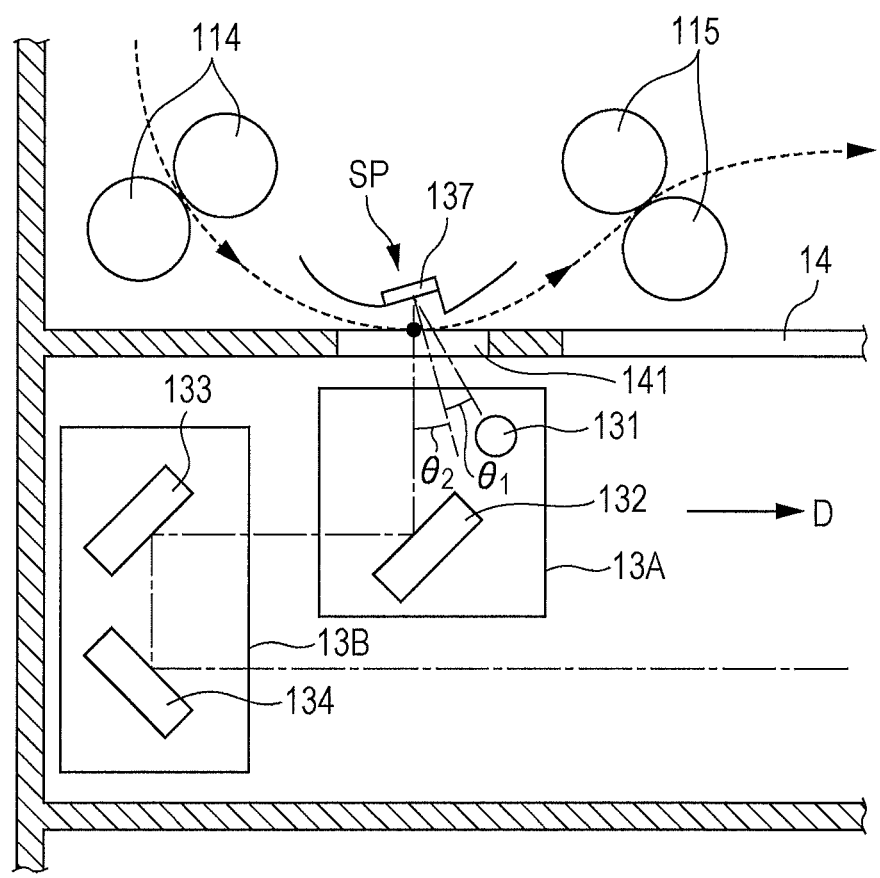
FIG. 7 is a partially enlarged view of FIG. 6.

FIG. 6 illustrates the image reading apparatus 10 of FIGS. 1 and 4. FIG. 7 is a partially enlarged view of FIG. 6.

The document M on the document tray 11 is transported one by one through the transport path that passes through the reading position SP, and is ejected onto the document output tray 12.

In FIG. 5, as transport members for transporting the document M, a first roller 111, second rollers 112, third rollers 113, fourth rollers 114, fifth rollers 115, and sixth rollers 116 are illustrated. Further, as a sensor for detecting whether there is a document being transported through the transport path, a first sensor 121, a second sensor 122, a third sensor 123, a fourth sensor 124, a fifth sensor 125, and a sixth sensor 126 are illustrated.

The transport path has a function of correcting the inclination of the document M. However, when this document inclination correcting function is used, a greater amount of noise is generated than in the case where this function is not used. In view of this, in the image reading apparatus 10, it is possible to select whether to use this document inclination correcting function. Selecting whether to use the document inclination correcting function will be described below. In the following description of this function, it is assumed that the document inclination correcting function is used.

The first roller 111 serves to feed one of plural documents M on the document tray 11 into the transport path. When the leading edge of the document M fed by the first roller 111 reaches the second rollers 112, the second rollers 112 remain at rest without rotating. Therefore, the leading edge of the fed document M collides with the second rollers 112, so that the document M bends. Thus, in the case where the fed document is laterally inclined, the inclination is corrected. After that, the second rollers 112 rotate such that the document M is further transported. Then, the document M collides with the third rollers 113 and bends again. Thus, the inclination of the document is corrected again. Subsequently, the document M is further fed by the third rollers 113. In order to prevent the document M from being pulled due to a velocity difference between the second rollers 112 and the third rollers 113, the document M is transported while being slightly bent between the second rollers 112 and the third rollers 113. The document transported by the third rollers 113 is further transported by the fourth rollers 114 so as to pass through the reading position SP. In this reading position SP, the document M is transported while being in contact with the upper surface of the transparent glass 14. The document M having passed through the reading position SP is further transported by the fifth rollers 115, and is ejected onto the document output tray 12 by the sixth rollers 116.

The first sensor 121 through the sixth sensor 126 detects passage of the fed document M at the respective positions of the sensors. Thus, the timing of starting rotation of the rollers, the timing of starting reading by the reading sensor 136, and the like are adjusted. As for the timing of starting reading by the reading sensor 136, in the case of performing an image inclination correction process on the image information as described with reference to FIG. 2A and FIGS. 3A through 3D, the adjustment of the timing of starting reading needs to be especially precise. Thus, compared to the case where the document inclination correction process described with reference to FIG. 6 is performed and an image inclination correction process is not performed on the image information, the timing is more accurately adjusted.

A reflecting member 137 is arranged at the back side of the document M passing through the reading position, that is, at a position such that the document M at the reading position SP is interposed between the reflecting member 137 and the lamp 131. The reflecting member 137 is an example of a background member of the present invention.

When the document M passes through the reading position SP, the document M is irradiated with light emitted from the lamp 131, and the reflected light is incident on the light receiving device 13 and is read by the reading sensor 136. Thus, image information is generated. The light receiving device 13 of this exemplary embodiment includes the mirrors 132 through 134, the lens 135, and the reading sensor 136.

The reflecting member 137 is disposed at an angle different from the angle of the document M. Specifically, the reflecting member 137 is inclined with respect to the document passing through the reading position SP such that the difference between an incident angle $\theta_1$ (FIG. 7) of the light emitted from the lamp 131 and a reflection angle $\theta_2$ (FIG. 7) of light reflected toward the light receiving device 13 is less than the difference between an incident angle and a reflection angle on the document M passing through the reading position SP. More specifically, in this exemplary embodiment, the reflecting member 137 is inclined such that the incident angle $\theta_1$ and the reflection angle $\theta_2$ on the reflecting member 137 are substantially the same.

The reading sensor 136 starts reading the document M immediately before the document M reaches the reading position SP. Accordingly, immediately after the reading is started, reflected light from the reflecting member 137 is read. When the document M is read, a white portion of the document M having no image thereon is expected to have the greatest reflection intensity. In many cases, the edge portion of the document M has no image thereon and is white. The intensity of the light received by the light receiving device 13 is digitized and is represented by 255 levels. In this exemplary embodiment, the levels are configured such that light reflected from a white document is at a level of 210. As described above, the reflecting member 137 is inclined such that the incident angle $\theta_1$ and the reflection angle $\theta_2$ are substantially the same. Thus, light from the reflecting member 137 is received with a greater intensity than light from the white portion of the document M having no image. Accordingly, there is a change in pixel value on the leading edge of the document M in the image information. In this exemplary embodiment, the line representing the leading edge of the document M is recognized on the basis of the change in pixel value.

The lamp 131 and the first mirror 132 are mounted in a first carriage 13A, while the second mirror 133 and the third mirror 134 are mounted in the second carriage 13B. The lamp 131 and the first mirror 132 are examples of a light source and a light receiving unit, respectively, of the present invention.

In a transport reading mode, that is, in a mode in which the document M is placed on the document tray 11 and is fed and transported by the first roller 111 so as to be read in the reading position SP, the first carriage 13A and the second carriage 13B remain stationary in the respective stationary positions shown in FIGS. 6 and 7. Thus, the document M transported to the reading position SP is irradiated by the lamp 131, and the reflected light is read by the reading sensor 136. However, these stationary positions are adjusted as will be described below. On the other hand, in the stationary reading mode, the document is placed face down on the transparent glass 14, and the first carriage 13A and the second carriage 13B move along the lower surface of the transparent glass 14 in a sub scanning direction, that is, the direction of the arrow D. In this case, the second carriage 13B moves at half the moving velocity of the first carriage 13A. Thus, the optical path length of the light reflected by the document on the transparent glass 14 to the lens 135 is maintained constant, so that the image of the document is accurately focused onto the reading sensor 136.

Next, a process of adjusting the carriage stationary position in the image reading apparatus 10 of the multifunction machine 1 in the transport reading mode will be described (see FIG. 2B). When the stationary position of the carriage is changed, the axis of light emitted from the lamp 131 and reflected by the reflecting member 137 toward the first mirror 132 is changed. Further, a change in the stationary position of the carriage affects the intensity of the light emitted from the lamp 131, reflected by the reflecting member 137, and received by the light receiving device 13.

Figure 8:
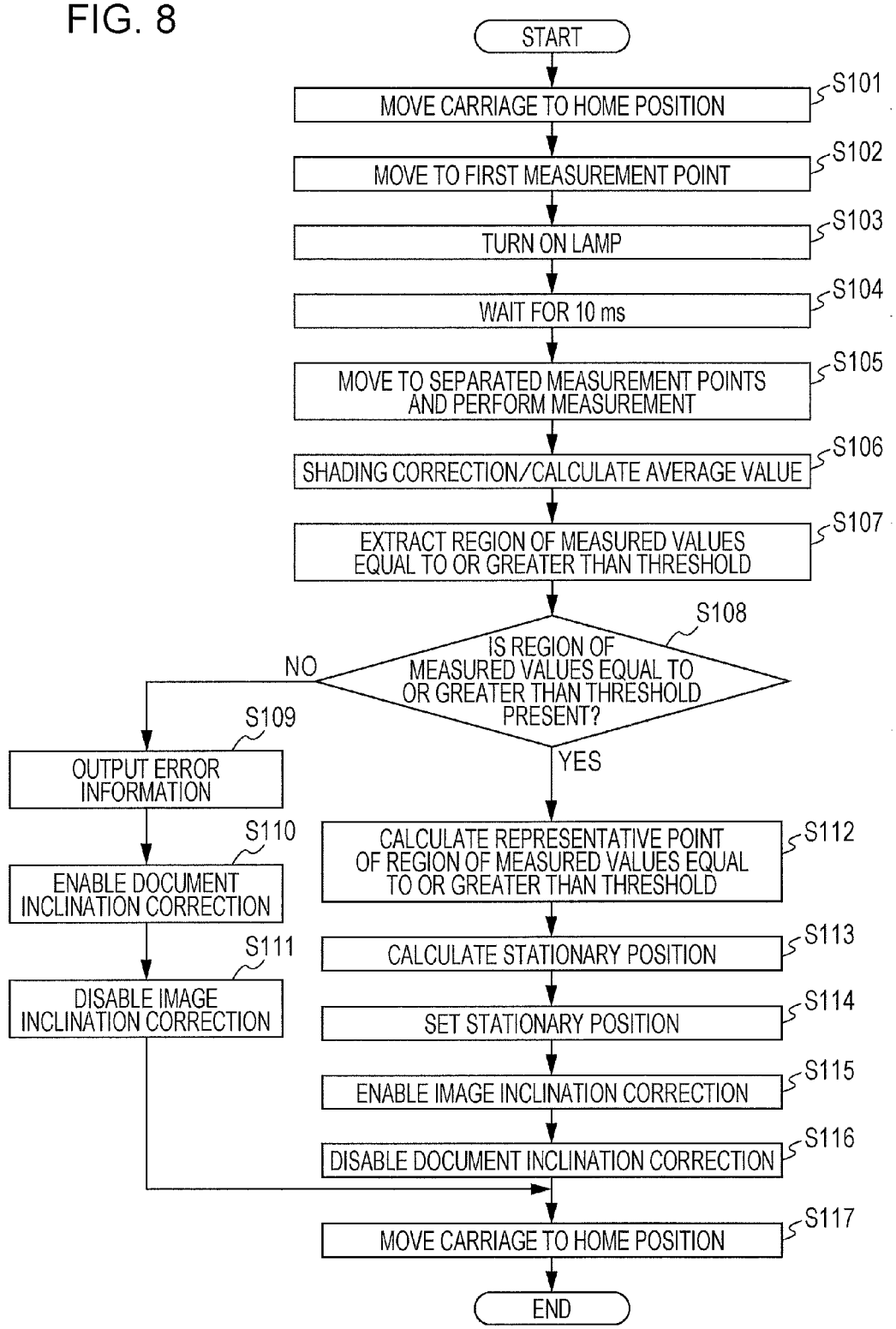
FIG. 8 is a flowchart illustrating a first example of a carriage position adjustment process.

FIG. 8 is a flowchart illustrating a first example of a carriage position adjustment process.

The carriage position adjustment process of FIG. 8 is performed in response to an instruction operation from the user interface 61 of FIG. 5, for example. As mentioned above, the image reading apparatus 10 is configured such that the upper part above the line n of FIG. 5 is hinged at the end so as to be lifted. If the upper part is slammed shut, the attitude of the reflecting member 137 might be changed due to the impact of the slamming. In the case of an apparatus in which such a change might occur, a sensor that detects opening and closing of the upper part or a sensor that detects impact may be provided. Thus, the process of FIG. 8 may be automatically performed upon detection of opening or closing or upon detection of impact.

Further, in the case where the edge of the document M is detected and the calculated inclination angle of the document M is greater than a predetermined threshold, the process of FIG. 8 may be performed on the basis of a determination that the edge detection is unsuccessful. Further, the process of FIG. 8 may be performed when the mode is changed. For example, when the mode is changed to a high image quality mode in which the document M is read with higher accuracy than usual, or when the mode is changed to a silent mode in which the amount of generated noise is reduced, the process of FIG. 8 may be performed.

On the other hand, in the case where the attitude is less likely to be changed due to handling by the user, the process of FIG. 8 may be performed by only the operator who visits the user of the apparatus for maintenance of the apparatus.

Further, in the case of an apparatus that has high reliability and does not need to be reconfigured once the apparatus is configured, the process of FIG. 8 may be performed only once when the apparatus is assembled.

In the carriage position adjustment process of FIG. 8, the position of the first carriage 13A with respect to the reflecting member 137 is adjusted. In order to maintain the optical path length constant, when the position of the first carriage 13A is adjusted, the position of the second carriage 13B is also adjusted in conjunction therewith. Accordingly, in the following description, the first carriage 13A and the second carriage 13B are not referred to individually, and are simply referred to as a carriage.

When the process of FIG. 8 is started, the carriage is first moved to a home position (HP) (step S101). A sensor is provided at the home position so as to detect the presence of the carriage in the home position. When the carriage is moved from the home position as a starting point, the movement distance is calculated from the rotation amount of a motor that moves the carriage. The current position of the carriage is recognized on the basis of the calculated movement distance.

After the carriage is moved to the home position, the carriage is moved to a first measurement point (step S102). The "first measurement point" is a point at an end of a measurement region that may potentially be selected as the stationary position of the carriage. The measurement region includes the stationary position of the carriage before the current adjustment which is used when reading the document M passing through the reading position SP.

When the carriage is moved to the first measurement point, the lamp 131 is turned on (step S103). Then, a waiting time (10 ms) is provided until the lamp 131 becomes substantially stable (step S104).

In the first example illustrated in FIG. 8, power is supplied to the lamp 131 such that the lamp 131 emits light having the same illuminance as the light emitted when reading the document M.

When the waiting time of 10 ms elapses after the lamp 131 is turned on, an operation of reading the light reflected from the reflecting member 137 and an operation of moving the carriage by one step (for example, 0.5 mm) are alternately performed (step S105).

Then, shading correction in a main scanning direction is performed for each measurement point (step S106). This shading correction is for correcting all the light intensity distributions, such as distribution of the intensity of the light emitted from the lamp 131 in a longitudinal direction (the main scanning direction perpendicular to the paper surface of FIGS. 6 and 7) and distribution of the intensity of the light at the edge of the lens 135. Further, in step S106, an average value of the image information in the main scanning direction is calculated for each measurement point after the shading correction.

FIG. 9 is a graph in which average values at respective measurement points are plotted.

The horizontal axis represents the sub scanning direction, which is the direction of movement of the carriage, and the vertical axis represents a measured value (an average value after shading, hereinafter simply referred to as a "measured value"). The intensity of the reflected light increases upward along the vertical axis. Circles represent measured values at the respective measurement points. In step S106 of FIG. 8, data shown in FIG. 9 is calculated.

Then, in step S107 of FIG. 8, a determination is made as to whether the measured value at each measurement point is equal to or greater than a threshold. Thus, a region D of measured values equal to or greater the threshold is extracted. The threshold used herein is set to a value corresponding to reflected light having a sufficiently greater intensity compared to a measured value of the light reflected from a white document M. Accordingly, it is possible to determine whether a measured value is of the light reflected from the reflecting member 137 or is of the light reflected from the document M with reference to the threshold.

In FIG. 9, four out of five measurement points in the region D have the same measured value. This indicates that light having an intensity greater than the maximum light intensity that the reading sensor 136 is able to read is incident on the reading sensor 136, so that the reading sensor 136 saturates and outputs the maximum value.

In step S108, a determination is made as to whether a region D of measured values equal to or greater than the threshold is present. If a region D of measured values equal to or greater than the threshold is not present, the process proceeds to step S109, in which error information indicating that the carriage position adjustment has failed is output to the touch panel 613 of the user interface 61 of FIG. 5. Then, in this case, a process of correcting an inclination of the document by collision of the document during transportation of the document, which is described with reference to FIG. 6, is enabled (step S110). Further, a process of correcting an inclination of the document on the basis of image information obtained by reading the document, which is described with reference to FIG. 2A and FIGS. 3A through 3D, is disabled (step S111). This is to avoid the risk that detection of the leading edge of the document in the image information fails due to the failed carriage position adjustment and hence correction of the inclination of the document in the image information fails. In this case, image information representing the image with no inclination is obtained by physically correcting the inclination of the document during transportation of the document, while allowing generation of noise. After that, the carriage is moved to the home position (step S117).

In the case where a region D of measured values equal to or greater than the threshold is determined not to be present in step S108 and the process proceeds to step S109, a new stationary position (position shown in FIGS. 6 and 7) of the carriage during reading of the document is not set. That is, in the next document reading operation, reading is performed while the carriage is held in the stationary position that is set by the last adjustment. This is because since the last adjustment is successful, the document is more likely to be correctly read when the reading is performed in the last adjustment position. However, in this case, error information is output to the user in step S109. Thus, the user may contact an operator of the manufacturer, and the cause of the failure of the position adjustment may be investigated.

In steps S108, as shown in FIG. 9, if a region D of measured values equal to or greater than the threshold is determined to be present, then a representative point of the region D is calculated (step S112). In this example, the center point of the region D is used as the representative point. Thus, a center point A of the region D is calculated in step S112. Alternatively, in the case where saturated measured values are obtained as shown in FIG. 9, the center point of a region D' where the saturated measured values are obtained may be used as the representative point.

Then, in step S112, the stationary position of the carriage during reading of the document is calculated on the basis of the calculated center point A.

The carriage may be stopped only at any of the measurement points separated by 0.5 mm described above. Accordingly, one of the measurement points separated by 0.5 mm is selected as the stationary position of the carriage.

The center point A calculated in step S112 is obtained by calculating the center of the region D. The center point A may match one of the measurement points separated by 0.5 mm. However, for example, in the case where the region D includes an even number of measurement points, the center point A does not match any of the measurement points.

In step S113, on the basis of the center point A, a measurement point that matches the center point A or one of the measurement points adjacent to the center point A (in the case where two measurement points adjacent to the center point A have different measured values, the measurement point having a measured value that represents a greater light intensity) is calculated as the stationary position. The calculated stationary position is set in the image forming apparatus 20 as information on the position to which the carriage is moved in the following document reading operation (step S114).

Then, a process of correcting an inclination of the document on the basis of image information obtained by reading the document is enabled in the image forming apparatus 20 (step S115). Further, a process of correcting an inclination of the document by collision of the document during transportation of the document is disabled (step S116). After that, the carriage is moved to the home position (step S117).

When adjusting the stationary position of the carriage during reading of the document, the reading position SP is adjusted in the manner described above such that the light reflected from the reflecting member 137 is received with a greater intensity by the reading sensor 136 than light reflected from predetermined white paper passing through the reading position.

After the position of the carriage is adjusted by the process shown in FIG. 8, the document M is read. Then, pixels expected to be on the edge of the document M are extracted, on the basis of the difference between the pixel value representing the intensity of the light reflected from the reflecting member 137 and the pixel value representing the intensity of the light reflected from the document M passing through the reading position SP in the image information. Thus, a line representing the edge of the document that is obtained by the calculation described with reference to FIG. 2A and FIGS. 3A through 3D is detected.

In the example described with reference to FIGS. 8 and 9, there is a region in which the output values of the reading sensor 136 are saturated, and the position where the intensity of the light incident on the reading sensor 136 is the greatest is unknown. Therefore, the stationary position of the carriage is calculated with reference to the center point A of the region D, and the position where the output value is saturated is calculated. However, in the case where the output value of the reading sensor 136 is not saturated, the stationary position of the carriage may be calculated with reference to the position where the intensity of the light incident on the reading sensor 136 is the greatest. Thus, the difference between the output value corresponding to reflection from the reflecting member 137 and the output value corresponding to reflection from the document is increased, so that the edge of the document is easily recognized.

Figure 10:
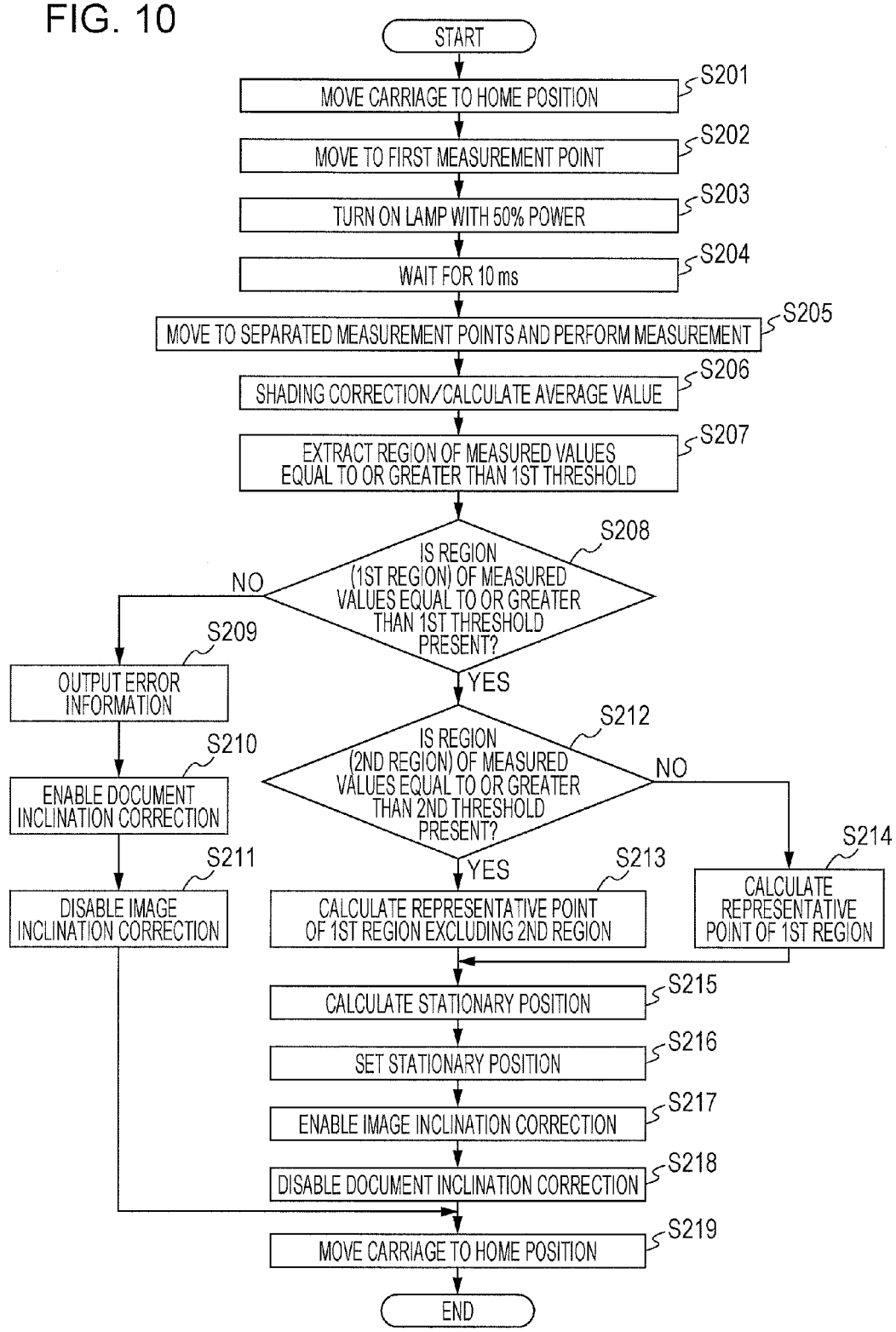
FIG. 10 is a flowchart illustrating a second example of the carriage position adjustment process.

FIG. 10 is a flowchart illustrating a second example of a carriage position adjustment process. The following describes the differences from the first example shown in FIG. 8.

The first example is described on the premise that reflected light having an intensity greater than the maximum light intensity that the reading sensor 136 is able to output as a measured value may be incident from the reflecting member 137 onto the reading sensor 136. On the other hand, in the second example, light having an intensity greater than the maximum light intensity is prevented from being incident on the reading sensor 136 by reducing the intensity of the light emitted from the lamp 131.

Steps S201 through S207 of FIG. 10 correspond to steps S101 through S107 of FIG. 8, respectively. However, in step S203, the power supply is restricted such that the power supplied to the lamp 131 is reduced to, for example, 50% of the power that is supplied during reading of the document. Thus, a weak light corresponding to the reduced power is emitted from the lamp 131.

A "first threshold" in step S207 of FIG. 10 has the same meaning as the "threshold" in step S107 of FIG. 8. More specifically, the "first threshold" has an intermediate value between a read value of the light reflected from the reflecting member 137 and a read value of the light reflected from the document, and is used for identifying the reflecting member 137 and the document and thereby recognizing the leading edge of the document. However, since the intensity of the light emitted from the lamp 131 is reduced compared to that when the document is read, the value of the "first threshold" is adjusted accordingly.

In step S207, a region (a first region $D_1$) of measured values equal to or greater than the first threshold is extracted.

FIG. 11 is a graph in which average values at respective measurement points are plotted. FIG. 11 corresponds to FIG. 9 illustrating the first example.

In FIG. 11, the horizontal axis represents the sub scanning direction, and the vertical axis represents a measured value (an average value after shading). The intensity of the light incident on the reading sensor 136 increases upward along the vertical axis. Circles represent measured values at the respective measurement points. In step S206 of FIG. 10, data shown in FIG. 11 is calculated.

Then, in step S207 of FIG. 10, a determination is made as to whether the measured value at each measurement point is equal to or greater than the first threshold. Thus, a region $D_1$ of measured values equal to or greater the first threshold is extracted.

In step S208, similar to step S108 of FIG. 8, a determination is made as to whether a region $D_1$ of measured values equal to or greater than the first threshold is present.

In step S208, a determination is made as to whether a region $D_1$ of measured values equal to or greater than the first threshold is present. If a region $D_1$ of measured values equal to or greater than the first threshold is not present, the process proceeds to step S209, in which error information indicating that the carriage position adjustment has failed is output to the touch panel 613 of the user interface 61 of FIG. 5. Then, in this case, a process of correcting an inclination of the document by collision of the document during transportation of the document is enabled (step S210). Further, a process of correcting an inclination of the document on the basis of image information obtained by reading the document, which is described with reference to FIG. 2A and FIGS. 3A through 3D, is disabled (step S211). These operations in steps S209 through S211 are the same as those in steps S109 through S111 of FIG. 8.

In steps S208, as shown in FIG. 11, if a region $D_1$ of measured values equal to or greater than the first threshold is determined to be present, then a determination is made as to whether a region (a second region $D_2$) of measured values equal to or greater than a second threshold is present (step S212). As illustrated in FIG. 11, the second threshold is a threshold corresponding to an intensity of the light incident on the reading sensor 136 greater than the first threshold.

The second threshold is set to a level such that if light having an intensity greater than the second threshold is incident on the reading sensor 136, the read value might be saturated, and image noise (for example, smear), temporary failure of a reading unit, troubles in the quantization step, and the like might occur. However, since the light intensity of the lamp 131 is reduced in step S203, the second threshold is also adjusted.

In step S212, if a region (a second region $D_2$) of measured values equal to or greater than the second threshold is determined to be present, a representative point of the first region $D_1$ excluding the second region $D_2$ is calculated (step S213). In this example, a center position A of a region between an end of the first region $D_1$ and an end of the second region $D_2$ closer to the end of the first region $D_1$ is used as the representative point. In step S212, if a region (a second region $D_2$) of measured values equal to or greater than the second threshold is determined not to be present, a measurement point at which the light is incident on the reading sensor 136 at the greatest intensity is calculated as the representative point.

In step S215, the measurement point (a measurement point B in the example of FIG. 11) closest to the representative point (the center point) calculated in the manner described above is calculated as the stationary position of the carriage.

Operations in the subsequent steps S216 through S219 are the same as those in steps S114 through S117 of FIG. 8.

According to the second example illustrated in FIGS. 10 and 11, when a second region $D_2$ is present, the carriage is adjusted to a position other than the position where the intensity of the light reflected from the reflecting member 137 and incident on the reading sensor 136 is the greatest. This may be useful in the case where light having an extremely high intensity might be incident on the reading sensor 136.

The timing when the process of the second example is performed is the same as the timing when the process of the above-described first example is performed.

In this exemplary embodiment, a region of measured values equal to or greater than the second threshold is determined, and thus a point having a measured value equal to or greater than the first threshold and less than or equal to the second threshold is set as the stationary position. However, if a measured value is determined to be greater than the first threshold, a position therearound may be set as the stationary position on the premise that the amount of received light varies along a bell curve as illustrated in FIG. 11. In this case, if there are plural points having measured values greater than the first threshold as shown in FIG. 11, the center point which is expected to have the highest amount of received light is not set as the stationary position.

Figure 12:
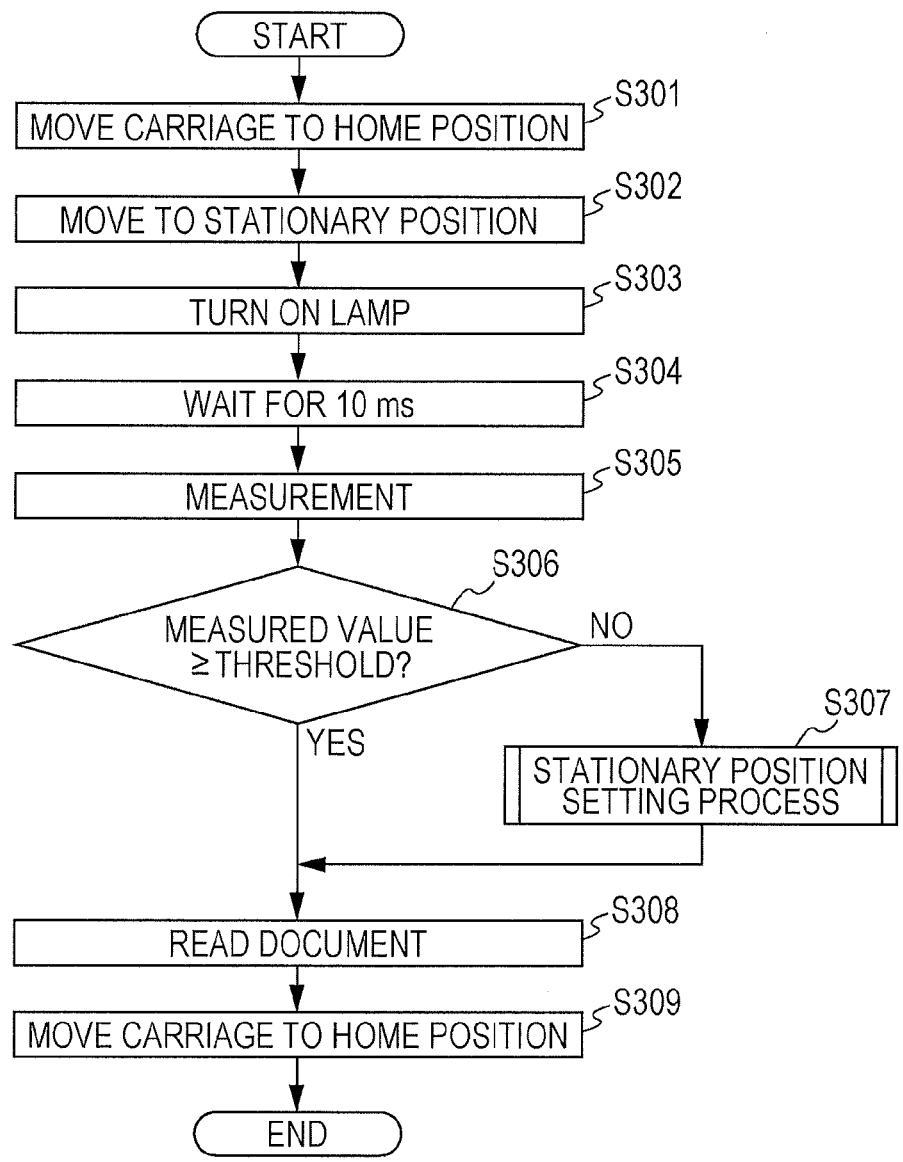
FIG. 12 is a flowchart illustrating a third example of the carriage position adjustment process.

FIG. 12 is a flowchart illustrating a third example of a carriage position adjustment process.

In the first and second examples that are described with reference to FIGS. 8 and 10, respectively, the position of the carriage is adjusted in advance, separately from when the document is read. In a third example illustrated in FIG. 12, the position of the carriage is adjusted when reading the document.

When the document M is placed on the document tray 11 of FIG. 5 and the start button 611 is pressed, a series of operations are started in accordance with the flow shown in FIG. 12.

In this example, the carriage is first moved to the home position (step S301), and is then moved to the stationary position (step S302). This stationary position is a stationary position for reading the document M transported to the reading position SP, and is set by the last position adjustment.

Then, the lamp 131 is turned on (step S303). In order to read the document M, power is supplied to the lamp 131 such that light having a regular intensity for reading a document is emitted. Then, a waiting time of 10 ms is provided until the light of the lamp 131 becomes substantially stable (step S303). Then, the reading sensor 136 measures the light reflected from the reflecting member 137 (step S304), and a determination is made as to whether a measured value equal to or greater than a threshold is obtained (step S306). The threshold in step S306 has the same value as the threshold of FIGS. 8 and 9.

In step S306, if a measured value equal to or greater than the threshold is determined to be obtained, the document M is read without adjusting the position of the carriage (step S308). When the reading is finished, the carriage is moved to the home position (step S309).

In step S306, if a measured value equal to or greater than the threshold is determined not to be obtained, the process of setting the stationary position of the carriage according to the example 1 illustrated in FIG. 8 is performed (step S307). After that, the document is read (step S308).

Note that, in step S307, a stationary position setting process according to the second example illustrated in FIG. 10 may be performed. In this case, the lamp 131 emits light having a reduced intensity in step S303, and a determination is made as to whether a measured value obtained by the measurement of step S305 is between the first threshold and the second threshold of FIGS. 10 and 11. If the measured value is between the two thresholds, the light intensity of the lamp 131 is increased to the light intensity for reading a document, and then document is read (step S308). If the measured value is not between the two thresholds, a stationary position setting process according to the second example illustrated in FIG. 10 is performed in step S307. After that, the light intensity of the lamp 131 is increased to the light intensity for reading a document, and then the document is read (step S308).

The image reading apparatus 10 of the multifunction machine 1 of this exemplary embodiment has a stationary reading mode for reading a document that is placed face down on the transparent glass 14. In this exemplary embodiment, in order to realize the stationary reading mode, the carriages 13A and 13B in which the mirror 132 and the mirrors 133 and 134 of the light receiving device 13 are respectively mounted are provided. However, in order to realize the stationary reading mode, a carriage corresponding to the carriage 13A may be provided with a reading unit in which components including a lamp and a reading sensor are mounted, for example. In this case, the position of the entire light receiving unit mounted in the carriage corresponding to the carriage 13A is adjusted.

The present invention is not limited to adjusting the position of the carriage. There are cases where a unit that adjusts the position of a carriage may not be employed, such as in the case of an image reading unit that does not have a stationary reading mode. In these cases, the position or attitude of a member other than the carriage may be adjusted.

For example, in the case of the configuration of FIG. 6, an adjusting mechanism that adjusts the attitude (inclination) of the reflecting member 137 may be provided. Thus, the attitude (inclination) of the reflecting member 137 may be adjusted. Alternatively, a mechanism that adjusts the position or attitude of the lamp 131 or the mirrors 132 through 134 may be provided. Thus, the position or attitude of any of these members may be adjusted without changing the stationary positions of the carriages 13A and 13B. That is, the position or attitude of an acting member that acts on the intensity of the light reflected from the reflecting member 137 and incident of the reading sensor 136 may be adjusted.

Further, in order to reduce the amount of light diffusely reflected by the reflecting member 137, an aluminum member or the like may be provided so as to change the angle and further increase the effect of increasing the intensity of received light.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a transporting member that transports a document having an image formed thereon and causes the document to pass through a reading position;

a light source that irradiates the document passing through the reading position with light;

a light receiving unit that receives light emitted from the light source and reflected at the reading position so as to generate image information;

a background member that is arranged at a position such that the document at the reading position is interposed between the background member and the light source, and that is inclined with respect to the document passing through the reading position such that, upon reflecting the light emitted from the light source toward the light receiving unit when the document is not present at the reading position, a difference between an incident angle of the light emitted from the light source and a reflection angle of light reflected toward the light receiving unit is less than a difference between an incident angle and a reflection angle on the document passing through the reading position; and an adjusting unit that adjusts a position or attitude of an acting member such that the light reflected from the background member is received with a greater intensity by the light receiving unit than light reflected from predetermined white paper passing through the reading position, the acting member acting on an intensity of the light reflected from the background member and received by the light receiving unit.

2. The image reading apparatus according to claim 1, further comprising:

a reading table on which the document is placed and read in a stationary state; and a carriage in which at least part of members of the light receiving unit and the light source are mounted, and which moves between a stationary position and a moving region, the stationary position being a position where the light source irradiates the document passing through the reading position with light while the carriage remains stationary, the moving region being a region where the light source irradiates the document with light while the carriage moves along the document placed on the reading table;

wherein the adjusting unit adjusts the stationary position of the carriage serving as the acting member.

3. The image reading apparatus according to claim 1, wherein the adjusting unit adjusts the acting member to a position or attitude in which an output value of the light receiving unit representing the intensity of the light reflected from the background member has a value representing a greatest light intensity.

4. The image reading apparatus according to claim 1, wherein the adjusting unit adjusts the acting member to a position or attitude other than a position or attitude in which the intensity of the light reflected from the background member and incident on the light receiving unit is the greatest.

5. The image reading apparatus according to claim 1, wherein the adjusting unit adjusts the light source such that the light source irradiates the background member by emitting light having an intensity less than an intensity of light that is emitted when irradiating the document passing through the reading position and generating the image information, and detects a position or attitude to which the acting member is to be adjusted.

6. The image reading apparatus according to claim 1, further comprising:

an error information outputting unit that outputs error information to a user of the image reading apparatus, if the adjustment by the adjusting unit fails.

7. The image reading apparatus according to claim 1, further comprising:

an edge detecting unit that detects an edge of the document on the basis of a difference between a pixel value representing the intensity of the light reflected from the background member and a pixel value representing an intensity of light reflected from the document passing through the reading position, in the image information generated by the light receiving unit.

8. The image reading apparatus according to claim 7, further comprising:

an inclination amount calculating unit that calculates an inclination amount of the document on the basis of the edge of the document detected by the edge detecting unit;

an image inclination correcting unit that corrects an inclination of the image formed on the document which is represented by the image information generated by the light receiving unit, on the basis of the inclination amount of the document calculated by the inclination amount calculating unit, and generates new image information representing the image whose inclination is corrected; and a controller that prevents the image inclination correcting unit from performing image inclination correction, if the adjustment by the adjusting unit fails.

9. The image reading apparatus according to claim 8, further comprising:

a document inclination correcting unit that is disposed upstream of the reading position in a direction in which the transporting member transports the document, and that corrects an inclination of the document by causing a leading edge of the transported document to collide with the document inclination correcting unit;

wherein, if the adjustment by the adjusting unit succeeds, the controller prevents the document inclination correcting unit from performing document inclination correction and causes the image inclination correcting unit to perform image inclination correction, and if the adjustment by the adjusting unit fails, the controller prevents the image inclination correcting unit from performing image inclination correction and causes the document inclination correcting unit to perform document inclination correction.

10. The image reading apparatus according to claim 1, wherein if the adjustment by the adjusting unit fails, the adjusting unit causes the acting member to maintain the position or attitude before the current adjustment.

11. A reading apparatus comprising:

a light source that emits light to the document passing through a reading position;

a background that is arranged at a position such that the document at the reading position is interposed between the background and the light source, and that is disposed at an angle different from an angle of the document;

a light receiving unit that receives reflected light from the document and reflected light from the background; and an adjuster that adjusts an optical axis from the light source to the light receiving unit such that the reflected light from the background is received with a greater intensity than reflected light from a white document.

12. The reading apparatus according to claim 11, further comprising:

a carriage that includes the light source and the light receiving unit, and moves so as to receive reflected light from a stationary document placed at a position different from the reading position;

wherein the adjuster adjusts the optical axis by moving the carriage.

13. A reading apparatus comprising:
a light source that emits light to the document passing through a reading position;
a background that is arranged on a side opposite to the light source such that the document at the reading position is interposed therebetween, and that is disposed at an angle different from an angle of the document;
a light receiving unit that receives reflected light from the document and reflected light from the background;
a moving unit that includes the light source and the light receiving unit, and moves so as to receive reflected light from a stationary document placed at a position different from the reading position; and
an adjuster that moves the moving unit, and adjusts an optical axis from the light source to the light receiving unit such that the reflected light from the background is received with a greater intensity than reflected light from a white document.

* * * * *